(12) United States Patent
Jaramillo

(10) Patent No.: US 11,728,758 B1
(45) Date of Patent: Aug. 15, 2023

(54) SUPPORT BASE FOR PHOTOVOLTAIC PANELS

(71) Applicant: Concept Clean Energy, Inc., Laguna Beach, CA (US)

(72) Inventor: Elliot Jaramillo, Berkeley, CA (US)

(73) Assignee: Concept Clean Energy, Inc.

( * ) Notice: Subject to any disclaimer, the term of this patent is extended or adjusted under 35 U.S.C. 154(b) by 0 days.

(21) Appl. No.: 17/212,086

(22) Filed: Mar. 25, 2021

(51) Int. Cl.
*H02S 20/10* (2014.01)
*H02S 20/30* (2014.01)
*F24S 25/61* (2018.01)
*F24S 25/11* (2018.01)
*H02S 20/00* (2014.01)
*F24S 25/00* (2018.01)

(52) U.S. Cl.
CPC ............... *H02S 20/10* (2014.12); *F24S 25/11* (2018.05); *F24S 25/61* (2018.05); *H02S 20/00* (2013.01); *H02S 20/30* (2014.12); *F24S 2025/02* (2018.05); *Y02E 10/47* (2013.01)

(58) Field of Classification Search
CPC .......... H02S 20/00; H02S 20/10; H02S 20/30; F24S 25/11; F24S 25/16; F24S 25/61; F24S 2025/02; Y02E 10/47
See application file for complete search history.

(56) References Cited

U.S. PATENT DOCUMENTS

| | | | | |
|---|---|---|---|---|
| 6,105,316 A * | 8/2000 | Bottger | ................... | F24S 25/11 52/27 |
| 8,307,606 B1 * | 11/2012 | Rego | ....................... | H01L 31/05 126/621 |
| 8,418,419 B1 * | 4/2013 | Aseere | .................... | F24S 25/33 52/173.3 |
| D800,055 S * | 10/2017 | Rothschild | .................... | D13/102 |
| D964,262 S * | 9/2022 | Jaramillo | .................... | D13/102 |
| 2010/0043781 A1 * | 2/2010 | Jones | ...................... | F24S 25/16 126/704 |
| 2010/0212714 A1 * | 8/2010 | Rothschild | .............. | H02S 20/00 248/346.03 |
| 2011/0108083 A1 * | 5/2011 | Ravestein | ............... | F24S 25/65 52/173.3 |
| 2011/0303212 A1 * | 12/2011 | Schwarze | ................ | F24S 25/11 126/569 |
| 2012/0186632 A1 * | 7/2012 | Reinhold | ................ | H02S 30/20 136/251 |
| 2012/0199180 A1 * | 8/2012 | Salam | ..................... | F24S 40/85 248/65 |
| 2012/0266944 A1 * | 10/2012 | Wildes | .................. | F24S 25/636 136/251 |
| 2013/0334382 A1 * | 12/2013 | Kanczuzewski | ........ | H02S 20/24 248/205.1 |
| 2015/0162866 A1 * | 6/2015 | Yun | ........................ | B63B 35/44 114/264 |
| 2016/0072426 A1 * | 3/2016 | Babineau, Jr. | ........ | F24S 25/634 52/173.3 |
| 2017/0366134 A1 * | 12/2017 | Burdick | .................. | H02S 20/30 |
| 2019/0168848 A1 * | 6/2019 | Niimi | ..................... | B63B 35/44 |

(Continued)

*Primary Examiner* — Jessie T Fonseca

(74) *Attorney, Agent, or Firm* — FisherBroyles, LLP; W. Scott Harders

(57) ABSTRACT

A ground-mounted system for supporting photovoltaic panels singularly or in an array of interconnected panels includes a support base, a plurality of legs connected to the support base on one side and to clips on an opposed side, where the clips connect to a photovoltaic panel.

10 Claims, 3 Drawing Sheets

(56) References Cited

U.S. PATENT DOCUMENTS

| | | | | |
|---|---|---|---|---|
| 2019/0222165 A1* | 7/2019 | Correia | ................... | H02S 20/30 |
| 2019/0341880 A1* | 11/2019 | Wang | ...................... | F24S 25/65 |
| 2020/0313601 A1* | 10/2020 | Wang | ...................... | F24S 20/70 |

* cited by examiner

SUPPORT BASE FOR PHOTOVOLTAIC PANELS

Photovoltaic (PV) panels are widely used to convert solar energy to electrical power. A typical solar panel installation is comprised of an array of ground mounted panels secured on a grid structure or rack system mounted securely to the ground. Nearly all current ground mounting systems include vast amounts of concrete, either as concrete footings and piers or concrete ballast.

Typical installations utilizing concrete footings or piers require several pre-installation steps and onsite installation steps. Pre-installation steps include, but are not limited to, obtaining soil studies; scheduling civil engineering inspections; notifying "underground service" location services to mark subsurface utilities; purchasing and delivering concrete, steel girding, and fittings; and arranging for construction equipment to grade terrain, dig holes, mix and pour concrete. Onsite installation steps include, but are not limited to, digging the holes; squarely lining up concrete forms, mounting bolts, or other materials; pouring the footings; carefully aligning the steel supports; and, then allowing the footings to cure for 48 or more hours before installation can be completed.

Installations utilizing concrete ballast or non-penetrating ground foundations typically attach racking systems directly to a concrete footing block that is either precast and delivered or poured into forms and cured on site around the posts. Pre-installation requires engineering analysis for site specific wind conditions; and purchasing and delivering either precast blocks or materials to form the footings onsite.

In both conventional systems, several hours per installed KW are required and frequently loss of two or more mobilization days to allow concrete curing.

Advances for solar ground mount systems have been minimal.

BRIEF DESCRIPTION OF DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

There are several related aspects of this disclosure. Generally, one aspect concerns modular, reconfigurable, photovoltaic systems, assemblies and methods.

Disclosed systems and methods are simple, yet effective to provide a ground-mounted PV panel or an array of PV panels capable of withstanding wind speed in excess of 110 miles per hour in Category C wind exposure areas at or about sea level.

Disclosed systems and methods are different than conventional systems employing concrete or steel footings and piers or concrete ballast.

The disclosure can be understood more readily by reference to the following detailed description, examples, and claims, and the disclosure in applications to which priority is claimed. Before the present system, devices, and/or methods are disclosed and described, it is to be understood that the invention is not limited to the specific systems, devices, and/or methods disclosed, as such can, of course, vary. It is also to be understood that the terminology used herein is for the purpose of describing particular aspects only and is not intended to be limiting.

The following description is provided as an enabling teaching of the invention in its best, currently known aspect. Those skilled in the relevant art will recognize that many changes can be made to the aspects described, while still obtaining the beneficial results shown and described. It will also be apparent that some of the desired benefits can be obtained by selecting some of the features without utilizing other features. Accordingly, those who work in the art will recognize that many modifications and adaptations are possible and can even be desirable in certain circumstances and are a part of the present disclosure. Thus, the following description is provided as illustrative of certain principles and not in limitation thereof.

Figure 1:
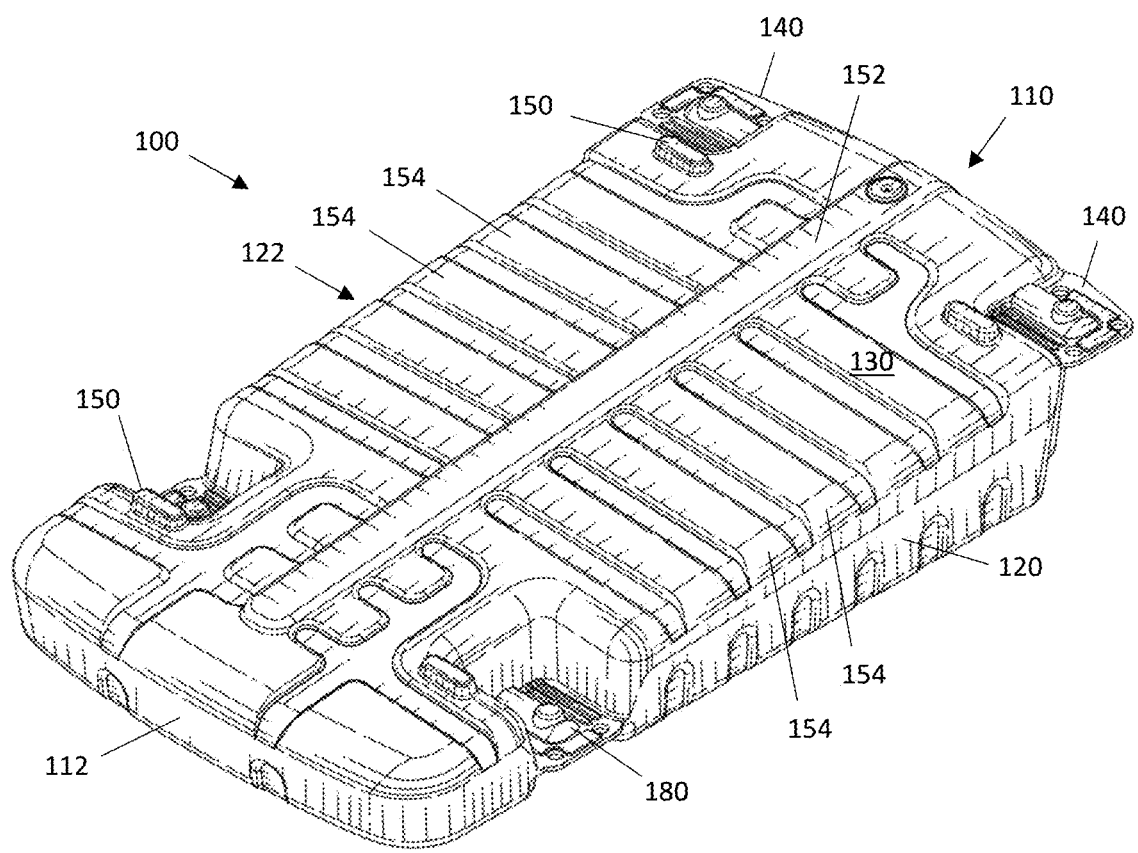
FIG. 1 is an upper perspective view of a ground mounted support base according to an aspect of the disclosure.
Figure 2:
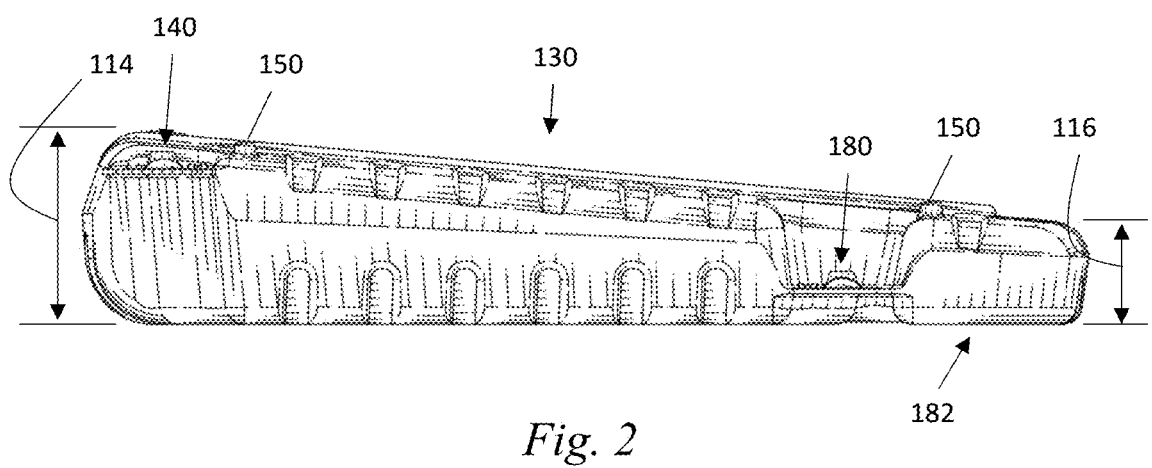
FIG. 2 is a side view of the support base of FIG. 1.

With reference to FIGS. 1 and 2, a ground-mounted support base 100 for a PV panel (not shown) to be supported at a desirable angle relative to the surface on which the support base is placed, for example an angle of about 10 degrees. The support base 100 includes a first end 110 and an opposed second end 112 of about the same width, but the first end 110 defines a first height 114 and the second end 112 defines a second height 116 less than the first height. The support base 100 includes a first side 120 and a second side 122 each depending from the opposed first and second ends 110, 112 such that the first and second sides 120, 122 each connect the first end 110 and the second end 112. An upper face 130 of the support base extends angularly downward from an upper side of the first end 110 to an upper side of the second end 112, and extends between the first and second sides 120, 122. The upper face 130 includes first connector platforms 140 disposed at corners where the sides 120, 122 meet the first end 110. In the illustrated embodiment, the upper face 130 also includes tabs 150 protruding upwards from the upper face 130 to accommodate complimentary recesses as discussed further below. A central spine 152 and plurality of ribs 154 are formed in the upper face 130 to provide added strength to the support base 100.

Figure 3:
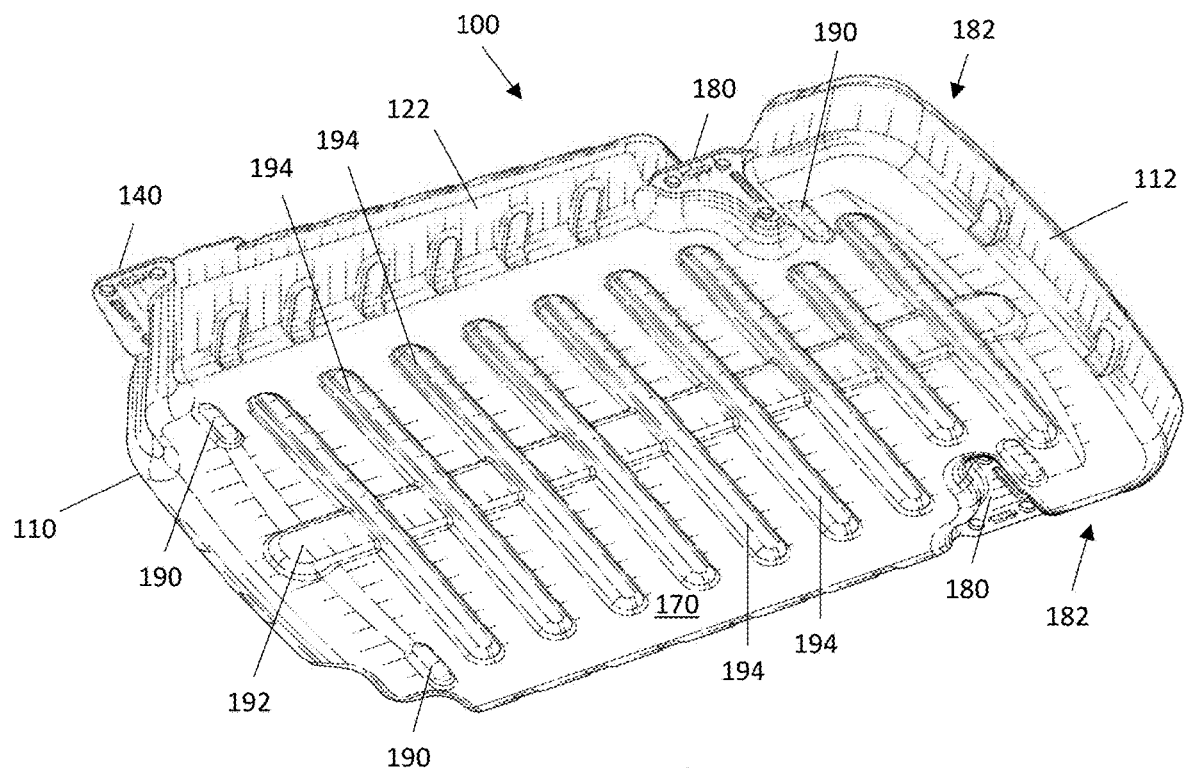
FIG. 3 is a lower perspective view of the support base of FIG. 1.

With reference to FIGS. 2 and 3, the support base 100 includes a bottom face 170 extending between the first and second ends 110, 112 and between the first and second sides 120, 122. Second connector platforms 180 are formed into the bottom face 170 toward but spaced inwardly from the second end 112. The inward spacing of the second connector platforms 180 forms a nose portion 182 of the support base 100 between the second end 112 and the location of the second connector platforms 180 that aids in tipping prevention of the support base. The bottom face 170 may include recesses 190 indenting into the bottom face 170 to receive tabs 150 from another support base when stacked. Similarly, a central spine recess 192 and/or a plurality of rib recesses

194 may indent into the bottom face 130 to provide added strength and receive the central spine and ribs from another support base when stacked. Support bases preferably stack alternately with a second end of one support base atop the first end of another support base.

Figure 4:
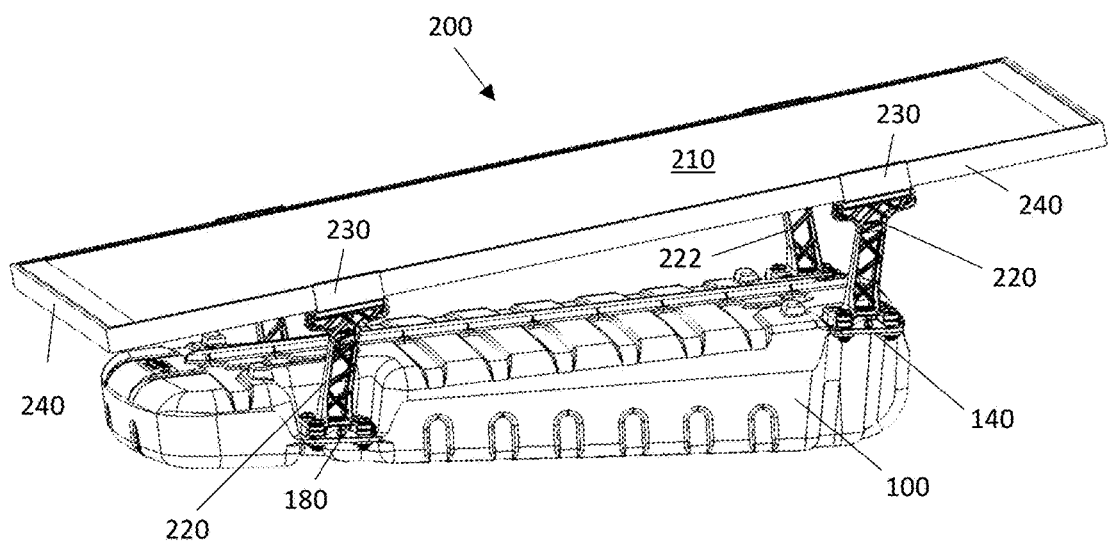
FIG. 4 is a perspective view of a photovoltaic panel assembly.

Referring now to FIG. 4, a PV assembly 200 is shown comprising a PV panel 210 supported by a support base 100. The assembly 200 includes two legs 220 on one side, and two mirror image legs 222 on the opposite side of the support base 100. In one embodiment, the legs 220, 222 are all the same height, and the desirable angled orientation of the PV panel 210 is achieved by the off-set height of the first connector platforms 140 relative to the second connector platforms 180 to which the legs 220, 222 are connected. Optionally, legs of different heights can be used to vary the angled orientation. Preferably the PV panel 210 is oriented between 3 and 20 degrees, more preferably between 5 and 15 degrees, and more preferably at about 10 degrees. Clips 230 are connected to an upper side of the legs 220, 222, and snap in place on the legs. The clips 230 in turn are connected to the PV panel 210. In the illustrated embodiment, the PV panel includes a frame 240 to which the clips are connected mechanically and additionally secured by adhesive or other connection or combination of connections. Preferably the PV panel 210 is oversized relative to the support base 100 providing some protection from elements and sun exposure.

Figure 5:
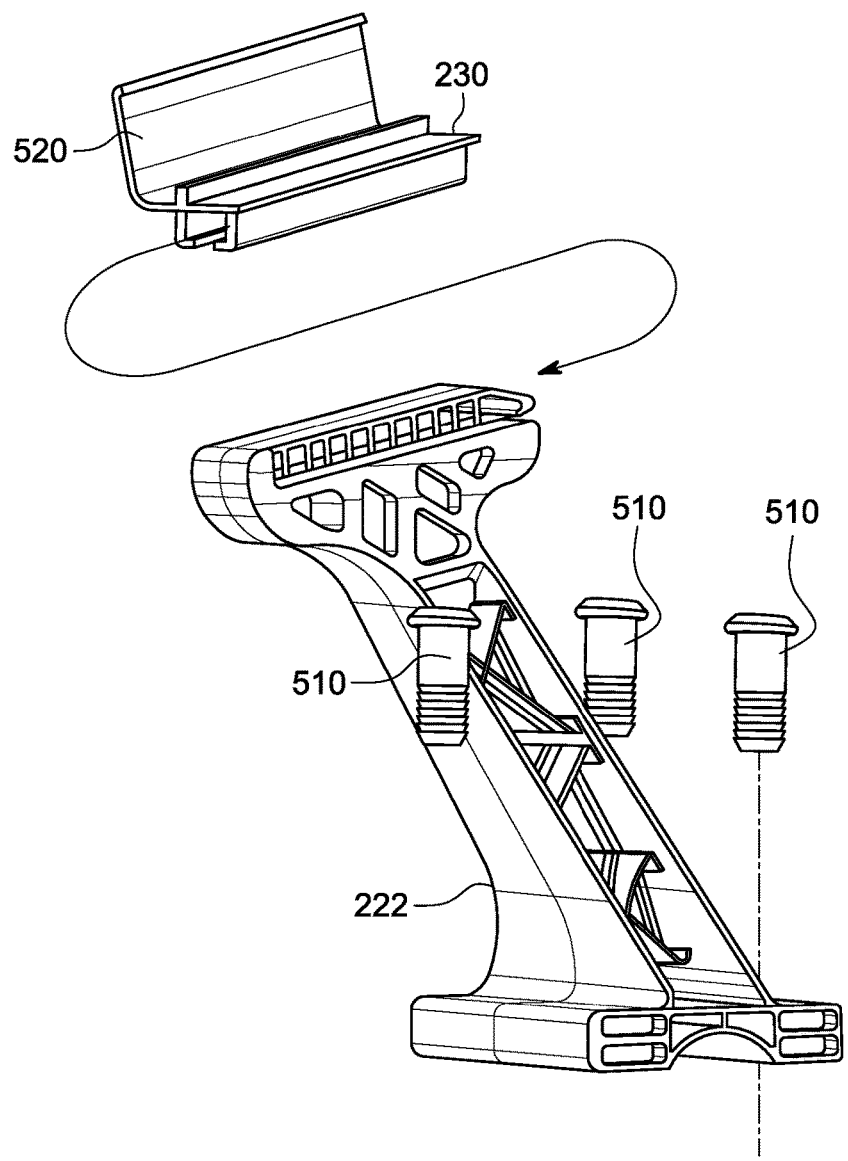
FIG. 5 is a perspective view of leg components.
Figure 6:
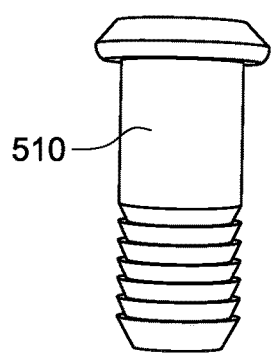
FIG. 6 is a detail of a pin.
Figure 7:
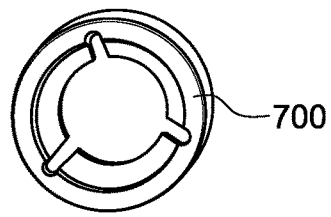
FIG. 7 is a top plan view of a nut.

Referring now to FIGS. 5-7, an enlarged detail of an exemplary leg 222 and pin 510 is shown. In one embodiment, the leg 222 connects to the support base (not shown) with press fit pins 510. When the pin 510 is urged through the leg 222 and applicable connector platform 140, 180, teeth on the pin 510 engage with a nut 700 on an underside of the relevant connector platform 140, 180 to hold the leg in place. In another embodiment, teeth on the pin may engage with holes on the connector platforms eliminating the need for a nut or providing additional security. The pin 510 may be solid for enhanced strength, but we have found pins with a hollow core or central cored shaft provide sufficient strength as well as providing a desirable path for wiring associated with the system. As currently envisioned, clip 230 will be specific to a particular PV panel or producer of PV panels depending on the frame size and configuration. In embodiments the clip 230 will include a strip of adhesive 520 or alternately a channel where adhesive is applied prior to connecting to the PV frame. The clip 230 slides onto a track in the leg 222 and locks in place although other means of connecting the clip to the leg may be substituted.

Testing results for a median sized 7.5 KW-500 kW system show that the described modular support base system significantly reduces project risks while providing 20-50+% direct cost savings and 100-300+% greater project completion speed. The described support base system using a modular one PV panel per support base configuration, provides cost and speed advantages compared to traditional concrete applications improves further for smaller installations and allows "do it yourself" installation. Systems can be installed without skilled labor or heavy machinery in under 1 hr per KW and because no concrete curing is required, single day installations are easily attainable.

Wind tunnel tests were conducted to assess resistance to wind loading on a system including a support base configured with a PV panel. A single module tilt of 10° was tested. The wind loads determined are based upon measurements obtained in an atmospheric boundary layer wind tunnel study conducted in accordance with the test procedures described in Section 6.6 of ASCE 7-05, Chapter 31 of ASCE 7-10 and 7-16, and ASCE/SEI 49-12.

Three modes of failure were considered: lifting, tipping or sliding. Based on the results of this study, and assuming the coefficient of friction between the tub and the ground is at least 0.45, unless the tubs are anchored to the ground and/or to each other, the primary mode of failure will be tipping. The results of the testing are presented as net gust coefficients to be multiplied by a 3-second gust wind pressure at a height of 10 m (33 ft), which is consistent with the procedures of ASCE 7.

The dominant wind load comes from the PV panel, while the loads on the support base were much smaller. The net uplift accounts for the fact that some downforce may be contributed from the support base as the panel undergoes uplift, and as a result the module load may be slightly higher than the net system uplift. Uplift is concentrated in the upper half of the panel.

The following equations reflect an understanding of one way that a structural engineer would implement the results of the study. The engineer may consider additional safety factors, as failure of a ballasted system in design event winds is immediate and could cascade to surrounding systems. This could include positive feedback, where motion of the support base worsens the wind loads. For example, friction coefficients will often drop once an object begins to slide. Also, if the support base tilts and are not full of water, the water ballast in the support base will slosh toward the point of rotation, reducing the moment arm from the support base. The tipping panel, now at a higher tilt, will create more drag and lift as a result, so that it is more likely to tip or slide.

If the system is to resist wind force by ballast alone, then we expect that the minimum weight requirements for sliding are calculated as:

$$W = q_z \cdot GC_s \cdot A_{ref}$$

where W is the total system weight, $q_z$ is the reference pressure, $GC_s$ is the sliding coefficient, and $A_{ref}$ is the area of the panels (PV area only).

The minimum weight requirements for overturning about the southern-most contact point of the support base and the ground are calculated as:

$$W = q_z \cdot GC_s \cdot A_{ref} \cdot L_{ref} / X$$

where x is the horizontal (N-S) distance from the center of mass of the system (including ballast) to the point of overturning. When a support base is filled with water (approximately 31.5 gallons, 262.4 pounds of water ballast), a system 200 should be able to withstand wind speeds of up to 110 miles per hour in Category C Exposure at or about sea level. This is believed achieved by the combined effects of the extended nose portion of the support base extending further past where the leg connects to connector platform to reduce tipping moment and push the center of gravity forward; the angled upper face reducing the area where wind can access the under side of the PV panel as well as providing a "spoiler" effect urging the support base down; and the weight of water ballast in the support base.

Unless the friction coefficient is lower than ~0.45, depending on the zone and the exact size of the panels, the support base would overturn at a lower speed than would be required to slide. If the risk of tipping or sliding is eliminated (for example, though interlinking between rows or ground anchors), then the system weight can be calculated using the minimum weight equation above, with $GG_L$ in the place of $GC_s$.

As used herein, the singular forms "a," "an" and "the" include plural referents unless the context clearly dictates otherwise. Thus, for example, reference to an "orifice"

includes aspects having two or more orifices unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Terms used herein, such as "exemplary" or "exemplified," are not meant to show preference, but rather to explain that the aspect discussed thereafter is merely one example of the aspect presented.

Additionally, as used herein, relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both." When the applicants intend to indicate "only A or B but not both" then the term "only A or B but not both" will be employed. Similarly, when the applicants intend to indicate "one and only one" of A, B or C, the applicants will employ the phrase "one and only one." Thus, use of the term "or" herein is the inclusive, and not the exclusive use. To the extent that the phrase "one or more of A, B and C" is employed herein, (e.g., storage for one or more of A, B and C) it is intended to convey the set of possibilities A, B, C, AB, AC, BC, and/or ABC (e.g., the storage may store only A, only B, only C, A&B, A&C, B&C, and/or A&B&C). It is not intended to require one of A, one of B, and one of C. When the applicants intend to indicate "at least one of A, at least one of B, and at least one of C," then the phrasing "at least one of A, at least one of B, and at least one of C" will be employed.

Although several aspects have been disclosed in the foregoing specification, it is understood by those skilled in the art that many modifications and other aspects will come to mind to artisans having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and are not intended as limiting.

What is claimed is:

1. A ground-mounted support base comprising:
   opposed first and second ends both comprising a first length, where the first end defines a first height and the second end defines a second height less than the first height;
   opposed first and second sides depending from the opposed first and second ends such that the first and second sides each connect the first end and the second end, where the opposed first and second sides comprise a second length greater than the first length;
   an upper face extending angularly downward from an upper side of the first end to an upper side of the second end and extending between the first and second sides, the upper face including at least a first connector platform disposed at a first corner formed by the first side meeting the first end,
   a bottom face extending between the first and second ends and between the first and second sides, the bottom face including at least a second connector platform spaced from a second corner formed by the first side meeting the second end;
   a first leg having a height, the first leg connectable to the first connector platform on one side of the first leg and connectable to a photovoltaic panel on a second side of the first leg; and
   a second leg having the height, the second leg connectable to the second connector platform on one side of the second leg and connectable to the photovoltaic panel on a second side of the second leg,
   where the photovoltaic panel is angled at least 5 degrees relative to the bottom face when supported by the first and second legs.

2. The ground-mounted support base as set forth in claim 1, further comprising the photovoltaic panel connected to the first leg and the second leg.

3. The ground-mounted support base as set forth in claim 1, further comprising a plurality of retainer pins to connect the first leg to the first connector platform.

4. The ground-mounted support base as set forth in claim 3, where the retainer pins include a cored shaft sized to accommodate cabling from the photovoltaic panel.

5. The ground-mounted support base as set forth in claim 1, where the support base includes an internal volume to retain at least 31 gallons of water ballast.

6. The ground-mounted support base as set forth in claim 2, further comprising 31 gallons of water ballast in an internal volume of the support base.

7. The ground-mounted support base as set forth in claim 6, where the support base resists tipping when exposed to a wind load of 110 miles per hour.

8. The ground-mounted support base as set forth in claim 1, where the upper face includes at least one tab protruding upward from the upper face to be received by a complimentary recess indenting into a bottom face of a second support base.

9. The ground-mounted support base as set forth in claim 1, where the first leg is a mirror image of the second leg.

10. The ground-mounted support base as set forth in claim 1, further comprising a clip to connect to a frame of the photovoltaic panel, where the clip is connected to either the first or the second leg.

* * * * *